Patented Mar. 22, 1938

2,111,576

UNITED STATES PATENT OFFICE 2,111,576

FROSTED GLASS AND METHOD OF MAKING SAME

Olus J. Stewart, Lexington, Ky.

No Drawing. Application May 24, 1935, Serial No. 23,336

11 Claims. (Cl. 91—70)

The present invention relates to improvements in frosted glass and the method of making the same, and aims generally to provide a new and different character of frosted glass as well as to provide a new, simple and economical method for the production of such glass.

Generally my invention provides a new frosted glass in which certain of the sodium atoms, as for example, in a soda lime glass, are displaced by a metal having a smaller atom, such as lithium, at least on the surface of the glass, which produces a new and different product in the form of a smooth, satiny attractive pearl white frosted surface.

Advantageously the process is carried out by bringing the glass in contact with molten lithium compounds, as by immersion, coating or spraying, and maintaining the contact between the glass and the molten lithium compounds sufficiently long to produce a frosted surface of the desired intensity on the glass.

More specifically the process comprises the steps of producing a bath of molten lithium compound, one of the most suitable being anhydrous lithium nitrate, either alone or combined with other lithium compounds. The temperature of the molten lithium compound bath may be varied somewhat as desired, but I have found that a molten lithium bath at a temperature of 300° C. gives satisfactory results.

The piece or article of glass desired to be frosted is then heated to a temperature approximating the temperature of the lithium bath, or to such temperature that undue strain will not be set up in the glass and crack it when the glass and lithium bath are brought into contact. The heated glass is then brought in contact with the molten lithium bath, as by immersion, spraying or otherwise, and this contact is maintained for a period of time sufficient to produce the intensity of the frosting desired which may be varied according to the concentration of the lithium bath, the temperature of the bath or the duration of the treatment, such treatment may be for two to fifteen minutes, depending upon the intensity of the frosting desired. After the glass is maintained in contact with the lithium bath for a sufficient time to produce frosting of desired intensity, the treated glass may be cooled, washed with tap water, and dried.

The glass produced by the above described process is clearly characterized by its smooth satiny pearl white surface.

Microscopic examination of the glass produced according to the above process discloses that the treated surface of the glass is characterized by minute surface fractures running to a large extent in parallel lines, and analysis shows that sodium atoms of the glass have been displaced by lithium atoms. The presence of the minute surface fractures is undoubtedly due to the fact that the lithium atoms are smaller than the displaced sodium atoms which causes a surface shrinking of the glass, and the formation of the minute fractures. The portions of the frosted glass surface between the minute surface fractures are characterized as flat top, sloping sided prismatic blocks. This, I believe, is responsible for the high degree of refraction and dispersion of light which is a characteristic of my new glass, because when strongly illuminated by a light located a few inches from the glass, the source of illumination does not appear localized but the entire surface of the glass is uniformly lighted and serves as a secondary source of light.

Although the surface of the glass produced in accordance with my process is characterized by minute surface or skin fractures, the strength of the glass of ordinary thickness is not impaired and experimentally the treated glass will withstand as much pounding and rough handling as untreated glass.

Advantages of my invention are many. The new method of producing frosted glass is relatively economical in practice and may be applied to semi-plastic glass either as it comes from a forming machine or merely by heating previously annealed glass to a temperature approximately equal to the temperature of the lithium bath and then dipping the glass in the bath.

Thus the invention is highly useful in the production of decorated glassware, and for the production of artificial pearl buttons and the like. More particularly, however, the invention is especially useful as a frosted glass for illuminating purposes, as for example, in the production of incandescent light bulbs which may be frosted both inside or outside. Such bulbs when frosted according to my invention produce a brilliant light yet one which is softer, more diffuse and easier on the eyes than present commercial frosted lamp bulbs. Also the process may be used to frost colored glass as well as colorless glass.

Although I have described several uses to which my invention is particularly adapted, I do not intend that the invention be restricted to such uses, as obviously many other uses are apparent to those skilled in the art.

What I claim as new and desire to secure by Letters Patent is:

1. As a new article of manufacture, a frosted glass, a surface of which is characterized by at least certain of the sodium atoms being displaced by lithium atoms, said lithium being confined to the surface region.

2. A glass body characterized by having a minutely fractured surface imparting a frosted appearance, said surface containing lithium atoms substituted for sodium atoms in the surface region of said body.

3. A glass electric light bulb having a minutely fractured surface containing lithium atoms substituted for sodium atoms, the lithium atoms and fractures being confined to the surface and causing a frosted effect.

4. The method of frosting glass which comprises subjecting a surface of the glass to a molten lithium nitrate.

5. The method of frosting sola-lime glass which comprises spraying a surface of the soda-lime glass with a molten lithium compound.

6. The method of frosting glass which comprises spraying a surface of the glass with a molten lithium salt.

7. The method of frosting glass which comprises immersing the glass to be treated in a bath of molten lithium compound.

8. The method of frosting glass which comprises immersing the glass to be treated in a bath of molten lithium compound and maintaining the time of immersion sufficiently long to produce a frosting of the desired intensity.

9. The method of frosting glass which comprises immersing the glass to be treated in a bath of molten lithium compound, and variably controlling the temperature of the bath according to the intensity of the frosting desired.

10. A method of frosting a glass surface comprising subjecting the surface in a heated condition to the action of molten lithium nitrate to produce a fracturing of the glass essentially confined to the surface.

11. A method of frosting a glass surface comprising subjecting the surface to the action of a molten lithium compound to produce a fracturing of the glass essentially confined to the surface.

OLUS J. STEWART.